US007898937B2

(12) United States Patent
O'Toole et al.

(10) Patent No.: US 7,898,937 B2
(45) Date of Patent: Mar. 1, 2011

(54) VOTING TO ESTABLISH A NEW NETWORK MASTER DEVICE AFTER A NETWORK FAILOVER

(75) Inventors: James O'Toole, Somerville, MA (US); Gang Lu, Sterling, MA (US)

(73) Assignee: Cisco Technology, Inc., San Jose, CA (US)

( * ) Notice: Subject to any disclaimer, the term of this patent is extended or adjusted under 35 U.S.C. 154(b) by 871 days.

(21) Appl. No.: 11/634,567

(22) Filed: Dec. 6, 2006

(65) Prior Publication Data

US 2008/0137528 A1 Jun. 12, 2008

(51) Int. Cl.
*H04J 1/16* (2006.01)

(52) U.S. Cl. ......................................... 370/216; 714/10

(58) Field of Classification Search ......... 370/216–228, 370/241–245; 714/10–12; 709/208–211
See application file for complete search history.

(56) References Cited

U.S. PATENT DOCUMENTS

| 4,634,110 | A | * | 1/1987 | Julich et al. | 714/11 |
| 5,533,188 | A | * | 7/1996 | Palumbo | 714/4 |
| 5,537,583 | A | * | 7/1996 | Truong | 713/500 |
| 5,790,791 | A | * | 8/1998 | Chong et al. | 709/208 |
| 5,903,717 | A | * | 5/1999 | Wardrop | 714/12 |
| 5,970,226 | A | * | 10/1999 | Hoy et al. | 714/25 |
| 6,061,809 | A | * | 5/2000 | Glaser et al. | 714/11 |
| 6,178,522 | B1 | * | 1/2001 | Zhou et al. | 714/12 |
| 6,925,578 | B2 | * | 8/2005 | Lam et al. | 714/4 |
| 6,990,320 | B2 | * | 1/2006 | LeCren | 455/67.11 |
| 7,155,704 | B2 | * | 12/2006 | Williams | 717/127 |
| 7,398,299 | B1 | * | 7/2008 | Ying | 709/208 |
| 7,571,313 | B2 | * | 8/2009 | Messerges et al. | 713/156 |
| 2002/0129296 | A1 | * | 9/2002 | Kwiat et al. | 714/10 |
| 2004/0078654 | A1 | * | 4/2004 | Holland et al. | 714/13 |
| 2006/0080678 | A1 | * | 4/2006 | Bailey et al. | 719/325 |
| 2007/0076590 | A1 | * | 4/2007 | Galpin et al. | 370/216 |

OTHER PUBLICATIONS

Manolis Marazakis, Distributive systems: Fault tolerance, 41, Department of Computer Science, University of Crete.
Ben Hardekopf, Secure and fault-tolerant voting in distributive system, 10, Air force research laboratory, 525 brooks road Rome, NY 13441-4505.

* cited by examiner

*Primary Examiner*—Huy D Vu
*Assistant Examiner*—Dady Chery
(74) *Attorney, Agent, or Firm*—Fish & Richardson P.C.

(57) ABSTRACT

Embodiments of the invention can resolve conflicts between candidate master network devices such as may be encountered in a failover condition. In a common type of failover protocol, two or more candidate master devices send messages to each other prior to a failover condition. A witness device (or process or service) also casts a vote to prevent a stalemate condition between the two candidate master devices that could lead to an error condition where multiple masters, or no masters, are elected.

18 Claims, 6 Drawing Sheets

VOTING TO ESTABLISH A NEW NETWORK MASTER DEVICE AFTER A NETWORK FAILOVER

BACKGROUND OF THE INVENTION

1. Technical Field

The present disclosure relates generally to electing a network master device upon a network failure.

2. Description of the Background Art

Various redundancy schemes are used to prevent network failure. Generally, a network includes at least one master network device and a back-up network device. The back-up network device supports the network when the master network device fails. The network devices interface through various protocols, called "failover protocols," to detect failure of network connectivity. A heartbeat protocol is one such protocol used for the detection of failed master network device and for activation of back-up network device to take over the functions of the master network device. Conventional methods and systems for redundancy schemes have two paired network devices. For example, two Cisco CSS (Content Service Switch) or two Cisco CSM (Content Switching Module) devices can be paired, to provide redundant network architecture within a data center network. Various multiple deployment modes are available to pair network devices. Active-Active is another mode of pairing devices in which both the devices are simultaneously active in case of failure of a network device.

However, existing methods and systems for redundancy schemes in active-active mode may lead to a dual master condition in which both of the active devices act as master devices. This dual master condition can occur, for example, when one active device is master for internal-facing Local Area Network (LAN) and the second active device is master for external-facing LAN, -based on protocols such as hot standby router protocol (HSRP). The dual-master conditions may also be aggravated by, for example spanning-tree convergence issues in the respective switched LANs, or by momentary connectivity failures. The existence of a dual master (or more than two masters) condition is highly undesirable as it could cause severe network problems. Other network conditions may cause another undesirable situation where no device is acting as the master. These undesirable conditions may be more likely to occur during a failover recovery attempt, or as a result of improper failover recovery.

DESCRIPTION OF EXAMPLE EMBODIMENTS

Overview

In an example embodiment the invention provides a method whereby a network includes a witness device and a plurality of candidate master devices, the method including: receiving at least one failover status message sent via the network from the candidate master devices; and generating a status message indicating a vote for a particular candidate master device so that the particular candidate master device becomes a new network master device.

Another example embodiment provides a system comprising: competing network devices, wherein the competing network devices include network devices providing equivalent services; a witness network device connected to competing network devices, the witness network device comprising: means for receiving status and addresses from each of the competing network devices; means for sending a status message to the competing network devices; and means for casting a vote.

Description

Embodiments of the invention can resolve conflicts between candidate master network devices such as may be encountered in a failover condition. In a common type of failover protocol, two or more candidate master devices send messages to each other prior to a failover condition. When a failover condition occurs each candidate master device sends a "vote" (e.g., a message, frame, packet, or other data item or signal) that indicates which candidate master device the sending device is trying to elect as the new master. The votes are transmitted to as many of the candidates as possible. In an example embodiment, candidate master devices have a count of how many candidate master devices (i.e., voting devices) are on the network. Using this count, a master device can determine when a candidate master device receives the most votes and can act accordingly to take over as the new master device, or to assign or defer network master device status to the winning candidate.

However, in some cases this approach may be ineffective. One example is when there are only two candidate master devices and a failure prevents the devices from communicating. This could happen when one of the candidate master devices has failed. The remaining working candidate device can cast a vote for itself as the new master device but it can not preclude a situation where the other (failed) candidate master device is also active and has voted for itself. Such a situation could occur where a network failure prevents communication. In other words, in the case of two candidate master devices, one candidate must receive two votes or it can not assume bus master responsibility.

In an example embodiment, a witness device (or process or service) acts as a third voter to prevent a stalemate condition between the two candidate master devices that could lead to an error condition where multiple masters, or no masters, are elected. The witness device will vote for a device from which it has received a status message indicating that the device is working properly. If more than one status message is received the device voted for can be decided arbitrarily or according to a predetermined scheme or criterion.

The existence and operation of the witness device is transparent to other failover and device master voting and election mechanisms that may be in use in the network. For example, most schemes involve symmetric or nearly symmetric voting protocols in which each participating device receives or fails to receive failover-status messages from all other devices.

The witness device casts its vote based on the status messages it receives by transmitting its own status message containing its vote to all other participating devices. The transmission may be a broadcast transmission, multiple single-cast or multi-cast transmissions, or other type of communication.

Each device, can correctly calculate which device has received sufficient votes (typically a majority but other schemes are possible) to be considered the master device. The device that becomes the master device can do so on its own by determining that it has received the necessary votes. Alternative embodiments are possible such as where an arbitrating device (e.g., a candidate master device, the witness device, or another device) can count the votes and assign master status to a winning device. Other possible variations include allowing a witness device to provide more than one vote, making the witness device's vote conditional upon different factors, etc.

In a particular embodiment, candidate master devices can be standard types of network devices such as a switch, router, server, firewall, load balancer, etc. However, in different embodiments any suitable type of device that can perform all or a portion of the functionality described herein may be employed. The witness device functionality can similarly be included in a standard network device, a dedicated device or in any suitable type of device that can also perform other functions.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Embodiments of the invention provide methods and systems to resolve an active-active race condition among a plurality of competing network devices. A master device in the network functions as a data forwarding agent between two networks. The master device may fail due to a software or hardware failure. There are network devices in the network that function as a backup for the master device. Therefore, services in the network continue uninterrupted in spite of the failure of the master device. Examples of services include but are not limited to, data, application softwares, computational service, and so forth. During the failure of the master device, network devices available as back up; compete against each other to take over the functions of the failed master device. The network devices that compete for taking over the functions of the failed master device are referred to as the competing network devices. The condition wherein more than one competing network devices are competing to become master is referred as an active-active race condition. Subsequently, the master device is selected from the competing network devices according to a voting scheme. Examples of the voting scheme include but are not limited to, a view-change scheme, a majority-voting election scheme and so forth.

A witness network device initiates voting to select a master device among the competing network devices. The witness network device authorizes the competing network devices to vote in the voting. The witness network device is a network device that connected to the competing network devices. Further, the witness network device receives information from the competing network devices. Additionally, the witness network device cast a vote to select the master device and activates the master device. Each of the competing network devices includes a master-voting agent that has the capability to vote when the master voting agent is authorized to vote during the voting.

Figure 1:
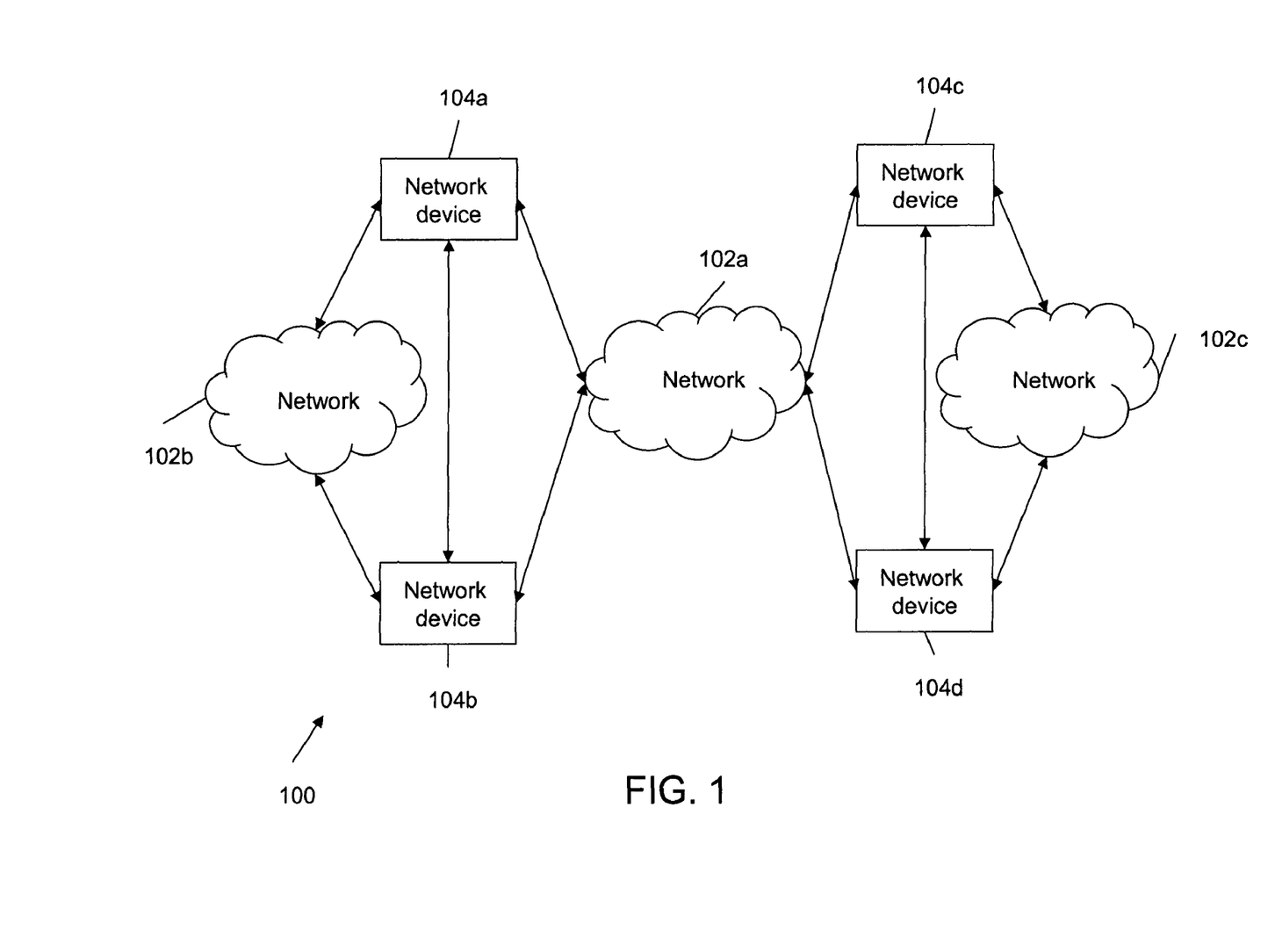
FIG. 1 illustrates an environment, in accordance with an exemplary embodiment of the present invention.

Referring now to drawings, more particularly by their reference numbers, FIG. 1 illustrates environment 100, in accordance with an embodiment of the present invention. Environment 100 includes networks 102 and network devices 104. Examples of networks 102 include but are not limited to, a Wide Area Network (WAN) or a Local Area Network (LAN), a client-server network, a peer-to-peer network and so forth. Network devices 104 enable transfer of data across networks 102. Examples of network devices 104 include but are not limited to a router, switch, or any other network infrastructure device. Access to services in networks 102 is provided on the basis of a hot standby router protocol. Network devices 104 communicate regularly, in accordance with a heartbeat protocol that can detect failure of a network device in networks 102.

Figure 2:
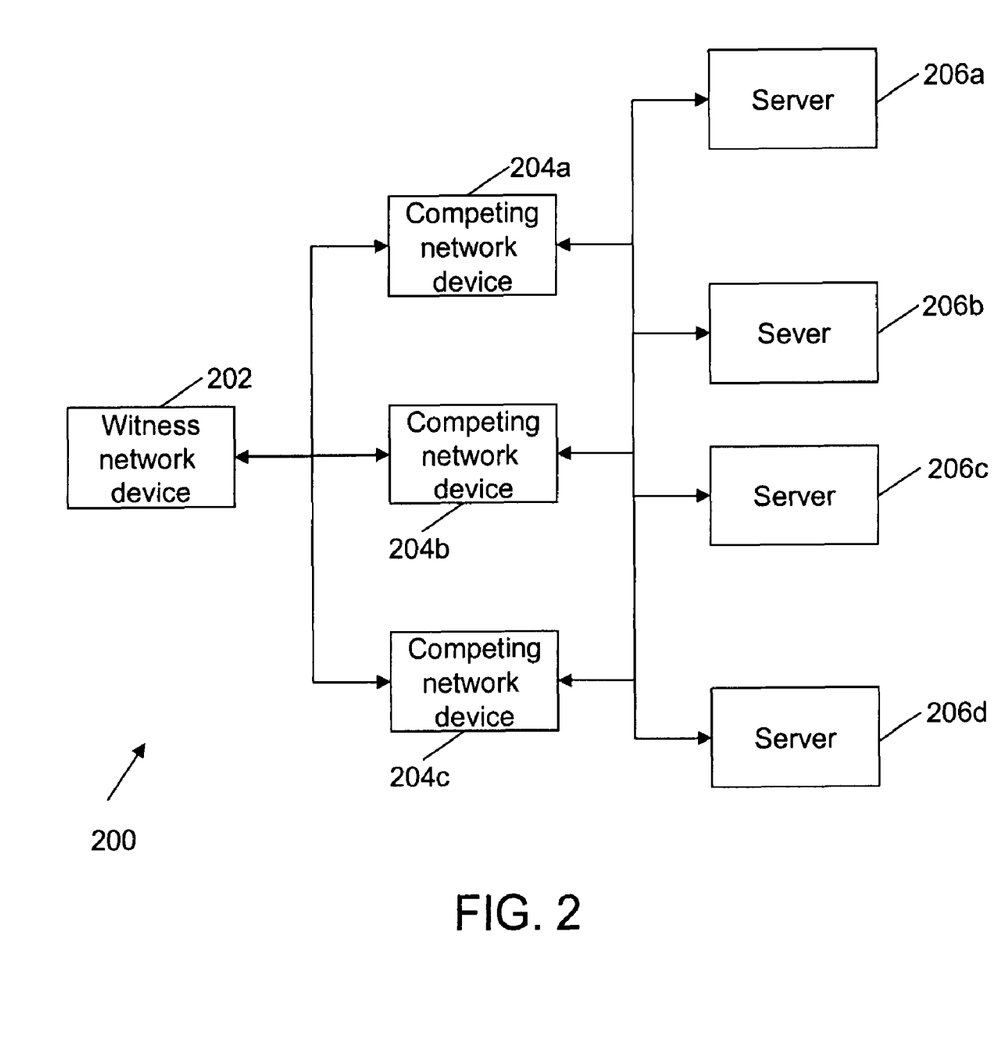
FIG. 2 is a block diagram illustrating an active-active race condition, in accordance with an exemplary embodiment of the present invention.

FIG. 2 is a block diagram of system 200, in accordance with an exemplary embodiment of the invention. System 200 includes witness network device 202, competing network devices 204 and servers 206. Competing network devices 204 are connected to servers 206. Competing network devices 204 are capable of providing a plurality of common services. Examples of services include but are not limited to, data, application softwares, computational service, and so forth. In the active-active race condition, competing network devices 204a, 204b, and 204c compete to become a master device for providing the services. A network device that monitors the process of selecting the master device is referred to as witness network device 202. Witness network device 202 initiates voting and may participate in the voting along with competing network devices 204, to select a master device. Further, witness network device 202 authorizes competing network devices 204 to vote in the voting. Witness network device 202 selects a network device among competing network devices 204a, 204b, and 204c for becoming a master device, based on a voting scheme.

In an embodiment of the present invention, the voting scheme used for selecting a master device is a view-change scheme. In the view-change scheme, witness network device 202 selects a set of competing network devices 204a, 204b, and 204c from network devices. The selection of the network device is based on the status of the network device and on the services it can provides. Witness network device authorizes the competing network devices to vote in the voting. Witness network device 202 analyzes votes received from the authorized competing network devices. Thereafter, witness network device 202 selects the master device among the competing network devices, based on the votes received from the authorized competing network devices. Subsequently, witness network device 202 sends a vote to a competing network device to activates the master device In another embodiment of the present invention, the voting scheme is majority-voting election scheme. In the majority-voting election scheme, each of competing network devices 204a, 204b, and 204c is authorized to vote in the voting. Witness network device 202 analyzes votes received from competing network devices 204. Thereafter, witness network device 202 selects the master device, based on the number of votes received from competing network devices 204 in the voting. Subsequently, witness network device 202 sends a vote to activate the master device.

Figure 3:
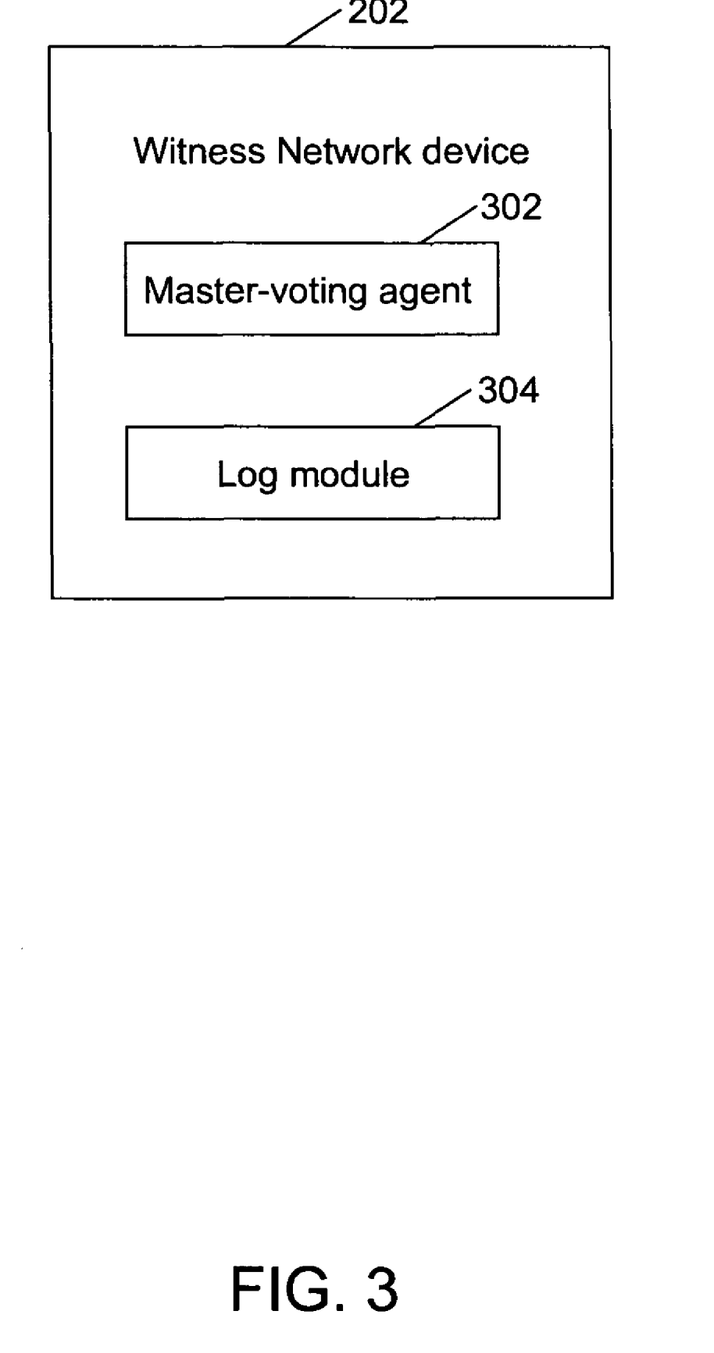
FIG. 3 is a block diagram illustrating a network device, in accordance with an exemplary embodiment of the present invention.

FIG. 3 is a block diagram of witness network device 202, in accordance with an exemplary embodiment of the present invention. Witness network device 202 includes master voting agent 302 and log module 304. Master voting agent 302, monitors voting and also analyses the votes receives by witness network device 202. Master voting agent 302 also cast a vote according to the voting schemes and based on occurrence of active-active race condition. When witness network device 202 becomes a standby network device due to the failure of network device 104, then the master device must transmit log messages to witness network device for any consistent shared state that the master device shared with other network devices. In case of a failure of the master device, the log message reveals information regarding the status of the transactions between the master device and network devices 104. Log module 304 receives and stores information related to the voting. Additionally, log module 304 monitors the status of network devices 104. The status of network devices 104 can be of a master or a slave. Log module 304 sends a status message to witness network device 202. The status message includes information related to selection of a competing network device as the master device. Log module 304 maintains a log of information related to the transactions of the master device.

Figure 4:
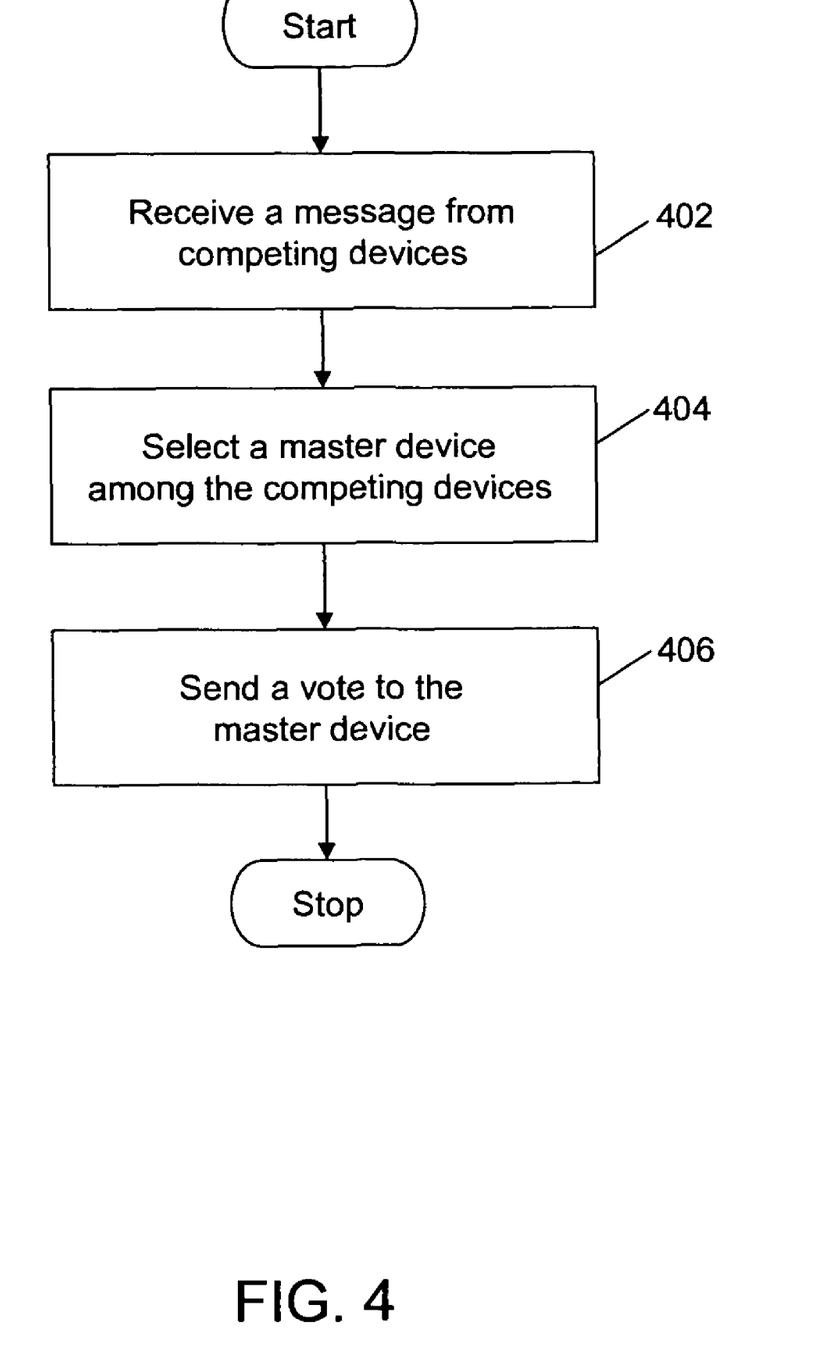
FIG. 4 is a flowchart of a method for implementing a redundancy scheme among a plurality of competing network devices, in accordance with an exemplary embodiment of the present invention.

FIG. 4 is a flowchart of a method for implementing a redundancy scheme among a plurality of competing network devices in a network, in accordance with an exemplary embodiment of the present invention. At step 402, a voting process is initiated by a witness network device 202 and casting of votes is performed. The votes cast by the competing network devices 204 received by log module 304. At step 404, a master device is selected from competing network devices 204a, 204b, and 204c. The master device is selected, based on a voting scheme. At step 406, a vote is sent to activate the master device by witness network device 202. The activation of master device includes process of providing services by the master device.

Figure 5A:
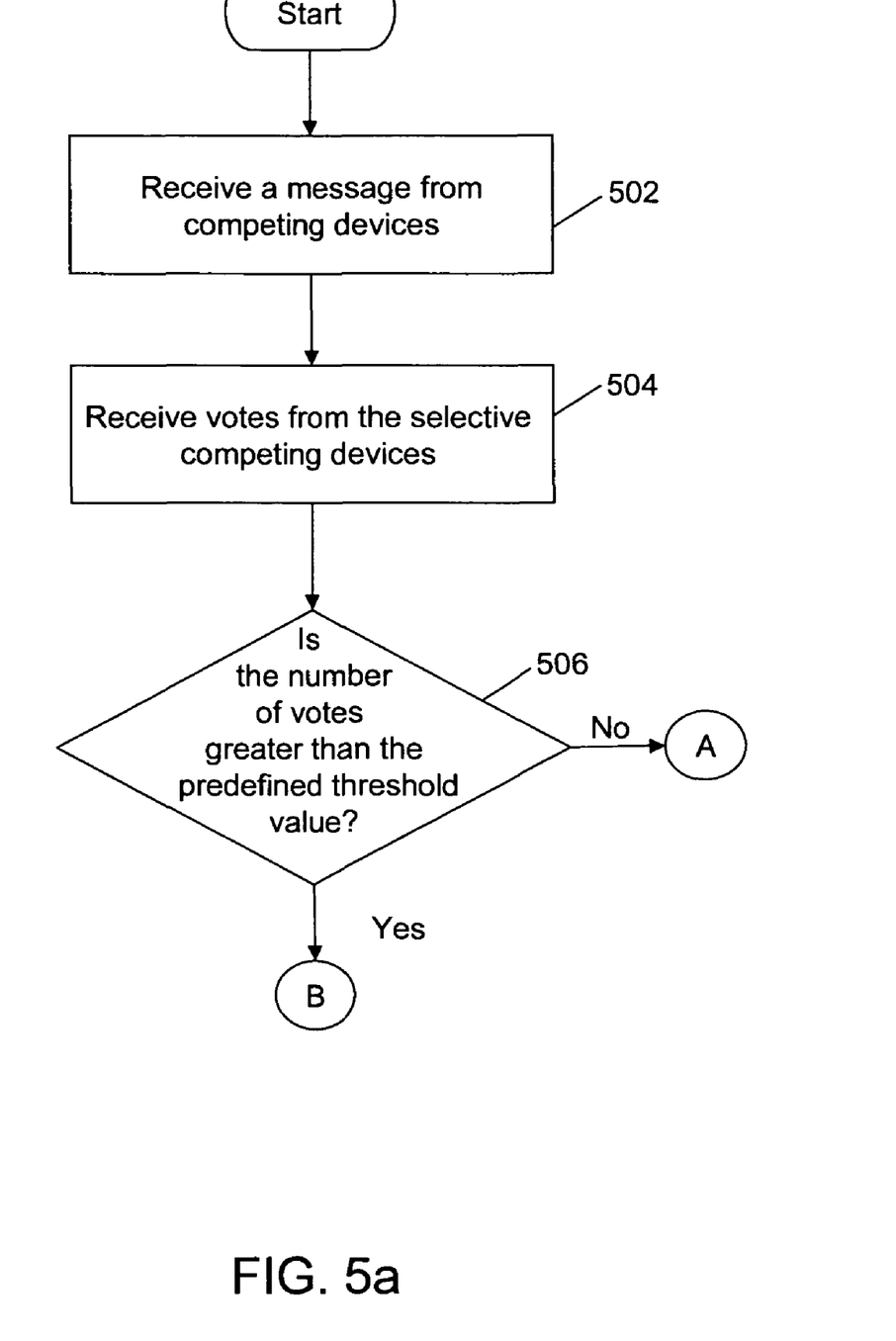
FIGS. 5a and 5b are flowcharts of a method for resolving an active-active race condition among a plurality of competing network devices, in accordance with an exemplary embodiment of the present invention.
Figure 5B:
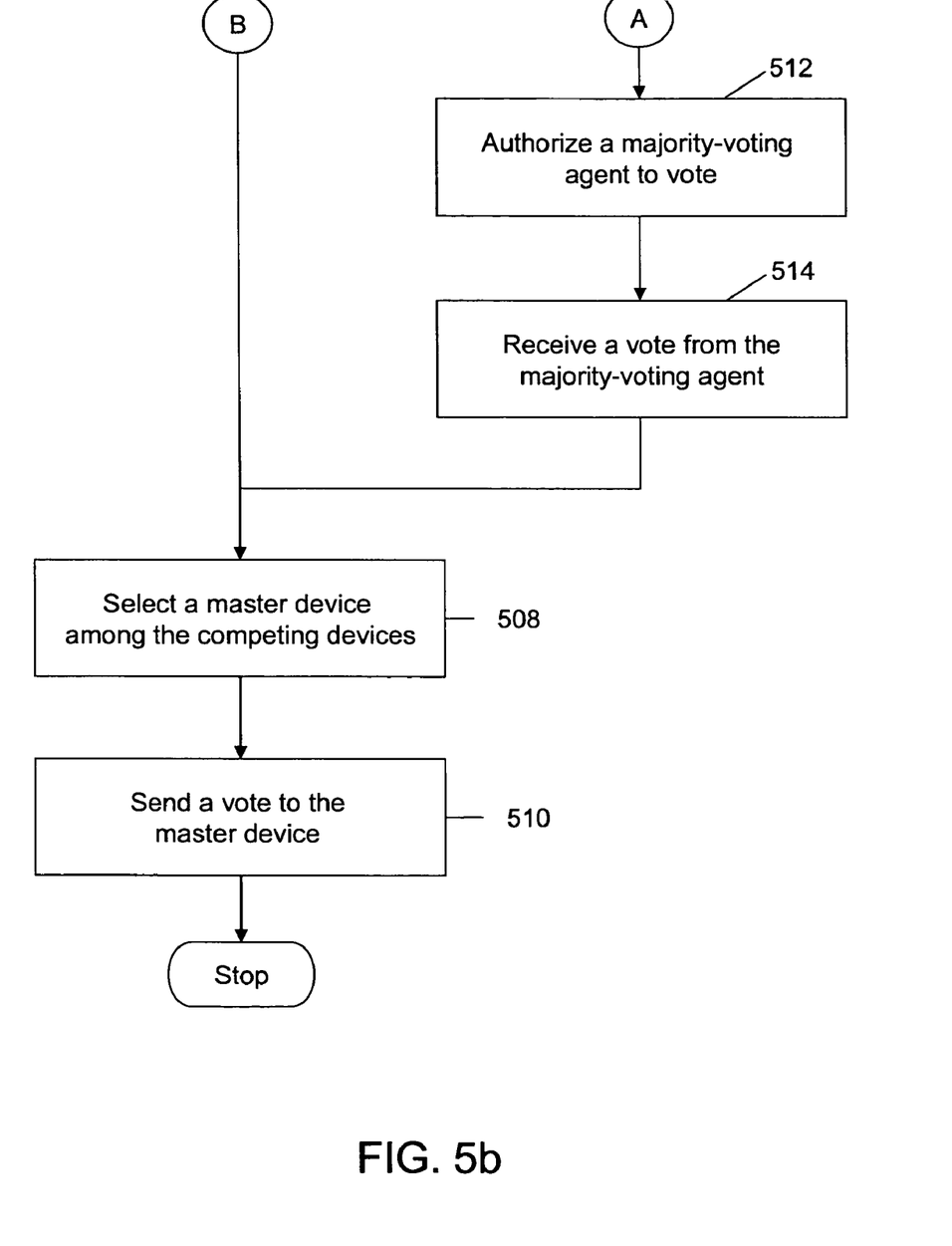

FIG. 5 is a flowchart of a method for resolving an active-active race condition among a plurality of competing network devices, in accordance with an exemplary embodiment of the present invention. At step 502, status and addresses are received from competing network devices 204. The status and addresses are received by witness network device 202. The status includes a designation of either a master or a slave. The address provides the information regarding location of the competing network device 204. The location of the competing network device 204 indicates servers 206 connected to the competing network devices 204. At step 504, votes from competing network devices 204 are received, in accordance with a voting scheme. The votes received from competing network devices 204 are stored in witness network device 202. In an embodiment of the invention, the voting scheme is a majority-voting election scheme. In the majority voting scheme, each of the competing network devices 204 are allowed to vote in the voting to select a master device. The number of votes received in the voting is compared with a predefined threshold value. The predefined threshold value depends upon the topology of the network. In another embodiment of the invention, the scheme is a view-change voting scheme. In the view-change voting scheme, a set of selected competing network devices are authorized to vote in the voting to select a master device. The set of selected competing network devices is selected based on the status of competing network devices 204 and also based on the service competing network devices 204, can provide. The number of votes received in the view-change voting scheme is compared with the predefined threshold value. At step 506, the number of votes received at step 506 is checked for the active-active race condition. The active-active race condition occurs when the number of votes received individually by two or more competing devices is equal and is also above a threshold value. At step 506, if the active-active race around condition occurs, then a vote for a competing network device is cast by witness network device 202 at step 508. At step 506, if the active-active race around condition doesn't occur then step 504 is performed. At step 510, the competing network device is activated as a master device. Subsequently, the master device takes over the functions of the failed network device.

Although the invention has been discussed with respect to specific embodiments thereof, these embodiments are merely illustrative, and not restrictive, of the invention. For example, features of the invention may be beneficial in applications that do not involve a failover condition (e.g., startup or initialization of a network, etc). Although it is envisioned that the functionality of the witness device will be implemented in a single common network device such as a switch, router, server, firewall, etc., other types of devices may be used. Portions of the functions described herein may be performed at various places (e.g., on different devices) and at different times, as desired.

One or more witness devices may be used. Any number and type of candidate master devices may also be used. In a particular embodiment the competing devices include so-called "Layer 5, 6 and/or 7 Content Switch" devices. It should be apparent that any suitable device, process or service can act to perform the functions or role of the candidate master devices and/or the witness device(s).

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain and store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
    receiving, at a witness device coupled to a network, at least one failover status message sent via the network from at least one of a plurality of candidate master devices, wherein the witness device authorizes one or more candidate master devices to vote;
    receiving one or more votes from the authorized candidate master devices;
    comparing a number of the one or more votes with a predefined threshold value, wherein a particular candidate master device is activated if the number of votes is greater than the predefined threshold value; and
    generating a status message indicating the vote for the particular candidate master device so that the particular candidate master device becomes a new network master device.

2. The method of claim 1, wherein the candidate master devices provide common network services.

3. The method of claim 1, wherein the candidate network devices provide address and status information to the witness network device.

4. The method of claim 3, wherein the status message includes a designation of a slave.

5. The method of claim 3, wherein the status message includes a designation of a master.

6. The method of claim 1, wherein the status message includes a vote, wherein the vote is used in a majority-voting election scheme.

7. The method of claim 1, wherein the status message includes a vote, wherein the vote is used in accordance with a view-change scheme.

8. The method of claim 7, wherein the view-change scheme comprises receiving a vote from a competing network device, wherein the competing network device is a network devices authorized to vote.

9. A system comprising:
competing network devices, wherein the competing network devices include network devices providing equivalent services;
a witness network device connected to the competing network devices, wherein the witness device authorizes one or more competing network devices to vote, and
wherein the witness network device comprises:
   means for receiving a status and an address from each of the competing network devices;
   means for sending a status message to the competing network devices;
   means for casting a vote;
   means for receiving one or more votes from the authorized competing network devices;
   means for comparing a number of the one or more votes with a predefined threshold value, wherein a particular candidate network device is activated if the number of votes is greater than the predefined threshold value; and
   means for generating a status message that indicates the vote for the particular candidate network device so that the particular candidate network device becomes a new network master device.

10. The system of claim 9, wherein witness network device further comprises:
a master-voting agent, the master-voting agent comprises:
   means for accepting votes from the competing network devices, wherein each of the competing network device is configured to cast the vote in accordance with a voting scheme; and
   means for casting a vote to a competing network device that includes information to activate the master device; and
a log module, the log module comprises:
   means for storing transaction information of at least one of the competing network devices.

11. The system of claim 9, wherein storing transaction information of at least one of the competing network devices is done for a period of time during which the competing network device is functional.

12. An apparatus comprising:
a processing system including a processor coupled a user input device;
software encoded in one or more tangible media for execution and when executed operable for:
   receiving, at a witness device coupled to a network, at least one failover status message sent via the network from at least one of a plurality of candidate master devices, wherein the witness device authorizes one or more candidate master devices to vote;
   receiving one or more votes from the authorized candidate master devices; comparing a number of the one or more votes with a predefined threshold value, wherein a particular candidate master device is activated if the number of votes is greater than the predefined threshold value; and
   generating a status message indicating the vote for the particular candidate master device so that the particular candidate master device becomes a new network master device.

13. The apparatus of claim 12, wherein the candidate master devices provide status information.

14. The apparatus of claim 13, wherein the status information includes a designation of a slave status.

15. The apparatus of claim 13, wherein the status information includes a designation of a master status.

16. Software encoded in one or more non-transitory computer-readable media for execution and when executed operable for:
   receiving one or more votes from a plurality of authorized candidate master devices, wherein a witness device authorizes one or more candidate master devices to vote;
   comparing a number of the one or more votes with a predefined threshold value, wherein a particular candidate master device is activated if the number of votes is greater than the predefined threshold value; and
   generating a status message indicating the vote for the particular candidate master device so that the particular candidate master device becomes a new network master device.

17. The non-transitory computer-readable media of claim 16, wherein the candidate master devices provide status information.

18. The non-transitory computer-readable media of claim 17, wherein the status information includes a designation of a slave status.

* * * * *